United States Patent
Park et al.

(10) Patent No.: US 9,940,705 B2
(45) Date of Patent: Apr. 10, 2018

(54) SYSTEM, METHOD AND COMPUTER PROGRAM PRODUCT FOR DETECTING DEFECTS IN A FABRICATED TARGET COMPONENT USING CONSISTENT MODULATION FOR THE TARGET AND REFERENCE COMPONENTS

(71) Applicant: KLA-Tencor Corporation, Milpitas, CA (US)

(72) Inventors: Allen Park, San Jose, CA (US); Martin Plihal, Pleasanton, CA (US)

(73) Assignee: KLA-Tencor Corporation, Milpitas (TW)

( * ) Notice: Subject to any disclaimer, the term of this patent is extended or adjusted under 35 U.S.C. 154(b) by 0 days.

(21) Appl. No.: 15/194,436

(22) Filed: Jun. 27, 2016

(65) Prior Publication Data

US 2017/0323434 A1 Nov. 9, 2017

Related U.S. Application Data

(60) Provisional application No. 62/331,567, filed on May 4, 2016.

(51) Int. Cl.
*G06K 9/00* (2006.01)
*G06T 7/00* (2017.01)

(52) U.S. Cl.
CPC .... *G06T 7/001* (2013.01); *G06T 2207/30148* (2013.01)

(58) Field of Classification Search
CPC .......... G06T 7/001; G06T 2207/30148; G01N 2021/95615
See application file for complete search history.

(56) References Cited

U.S. PATENT DOCUMENTS

| | | | |
|---|---|---|---|
| 6,392,229 B1 * | 5/2002 | Dana ................... | G03F 7/70625 250/423 F |
| 6,902,855 B2 | 6/2005 | Peterson et al. | |
| 7,418,124 B2 | 8/2008 | Peterson et al. | |
| 7,729,529 B2 | 6/2010 | Wu et al. | |
| 7,769,225 B2 | 8/2010 | Kekare et al. | |
| 8,045,785 B2 * | 10/2011 | Kitamura ................. | G06K 9/00 348/125 |
| 8,111,900 B2 | 2/2012 | Wu et al. | |
| 8,126,255 B2 | 2/2012 | Bhaskar et al. | |
| 8,213,704 B2 | 7/2012 | Peterson et al. | |

(Continued)

OTHER PUBLICATIONS

International Search Report and Written Opinion from PCT Application No. PCT/US2017/031147, dated Aug. 17, 2017.

*Primary Examiner* — Ali Bayat
(74) *Attorney, Agent, or Firm* — Zilka-Kotab, PC

(57) ABSTRACT

A fabricated device having consistent modulation between target and reference components is provided. The fabricated device includes a target component having a first modulation. The fabricated device further includes at least two reference components for the target component including a first reference component and a second reference component, where the first reference component and the second reference component each have the first modulation. Further, a system, method, and computer program product are provided for detecting defects in a fabricated target component using consistent modulation for the target and reference components.

19 Claims, 7 Drawing Sheets

(56) References Cited

U.S. PATENT DOCUMENTS

| | | | |
|---|---|---|---|
| 8,295,580 B2* | 10/2012 | Kuan | G06T 7/001 382/141 |
| 8,513,625 B2* | 8/2013 | Dana | G03F 7/70625 250/234 |
| 8,826,200 B2 | 9/2014 | Park et al. | |
| 9,177,372 B2* | 11/2015 | Tsuchiya | G06T 7/0002 |
| 9,536,299 B2 | 1/2017 | Park | |
| 2002/0158197 A1* | 10/2002 | Dana | G03F 7/70633 250/306 |
| 2007/0031026 A1 | 2/2007 | Kurihara et al. | |
| 2009/0252403 A1 | 10/2009 | Harada et al. | |
| 2010/0226562 A1 | 9/2010 | Wu et al. | |
| 2013/0070078 A1 | 3/2013 | Takagi et al. | |
| 2015/0012900 A1 | 1/2015 | Shifrin et al. | |
| 2016/0364875 A1* | 12/2016 | Seki | G06K 9/56 |

\* cited by examiner

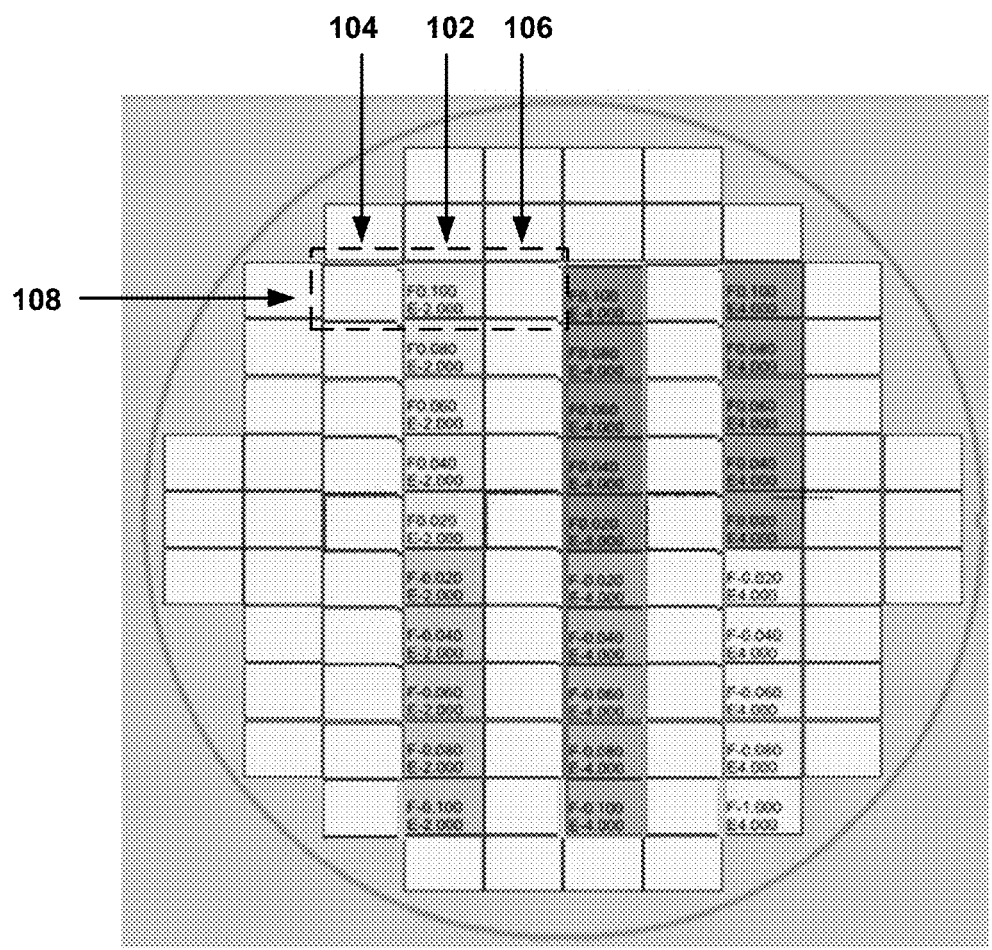
**PRIOR ART
FIGURE 1**

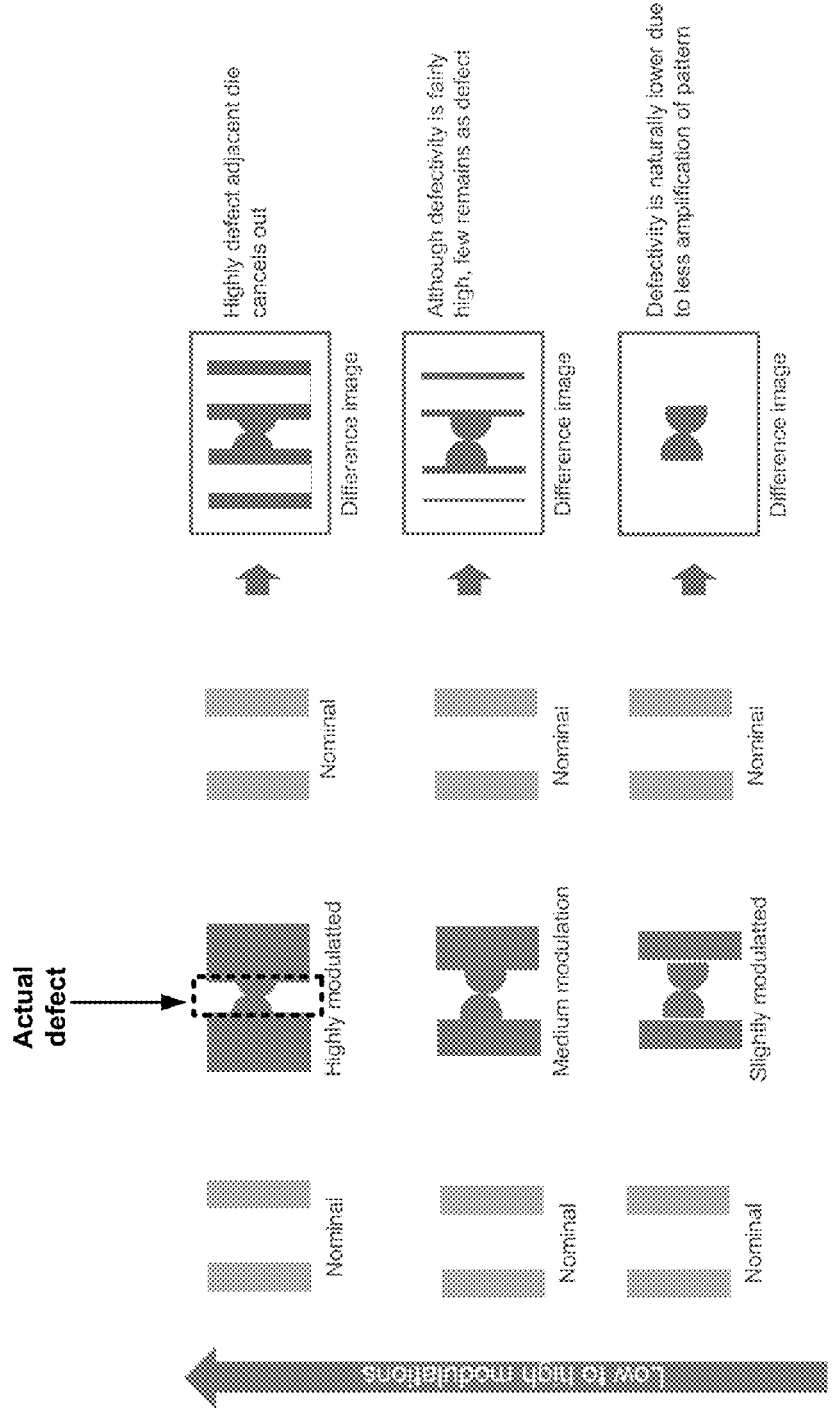
PRIOR ART
FIGURE 2

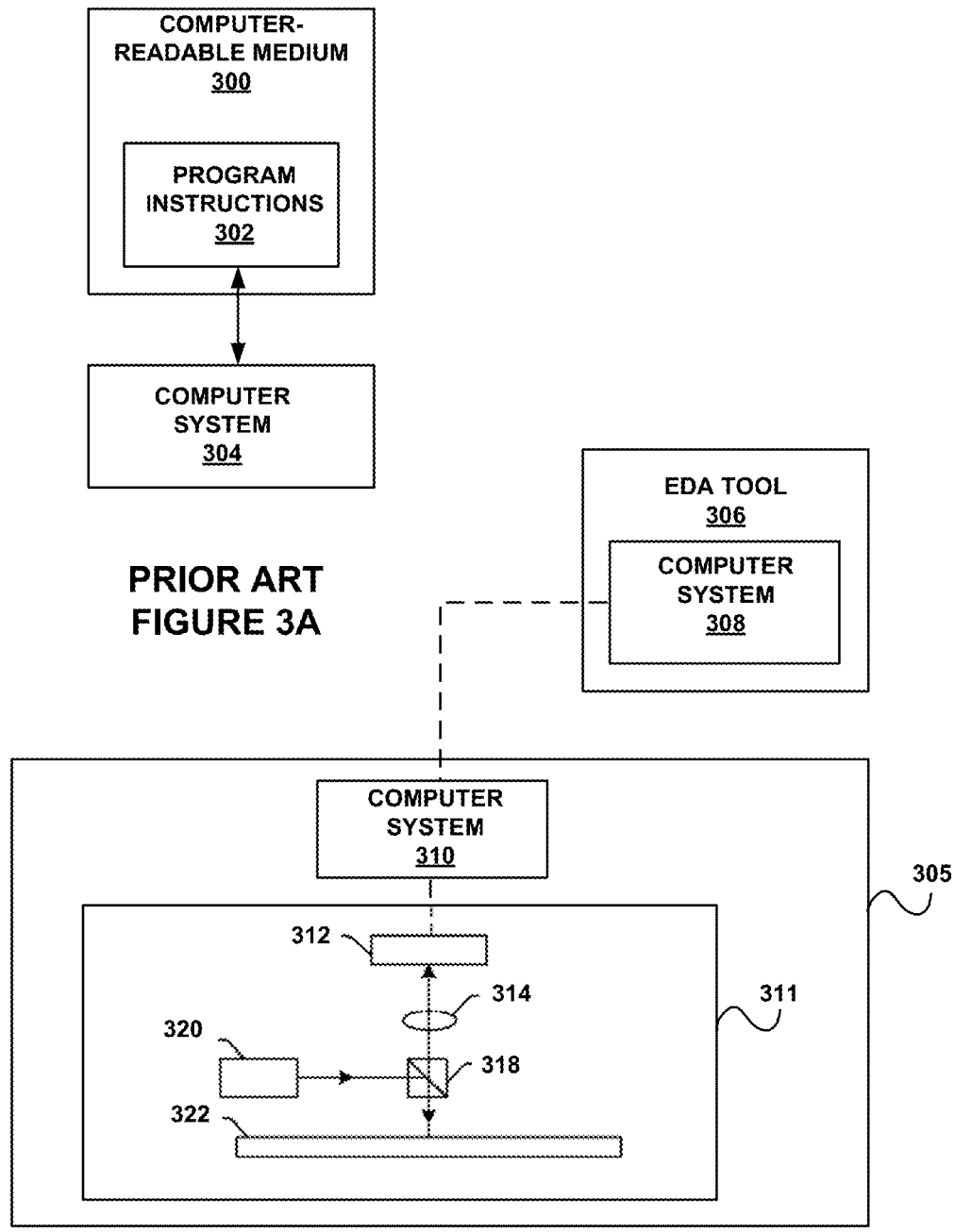
PRIOR ART
FIGURE 3A
PRIOR ART
FIGURE 3B

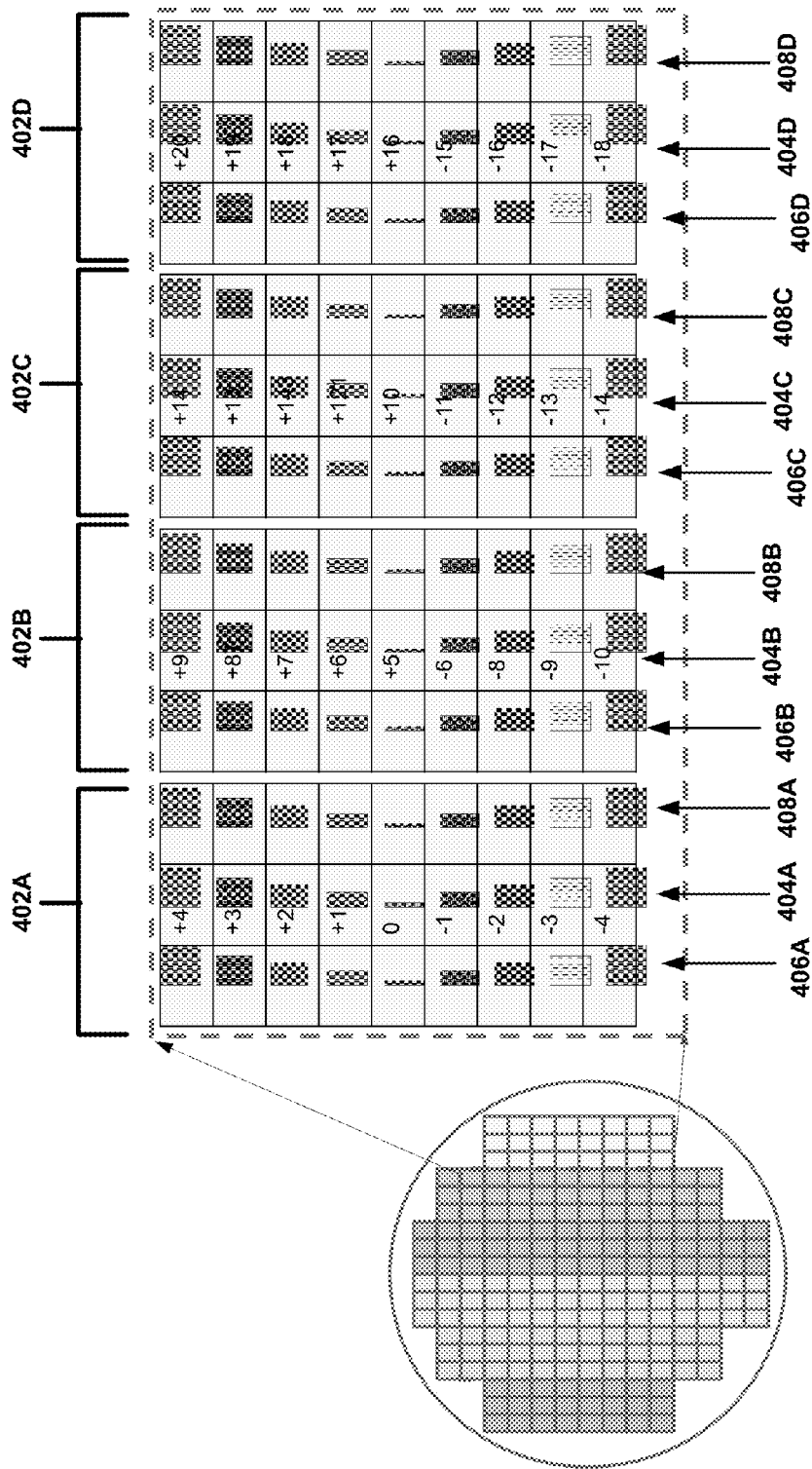

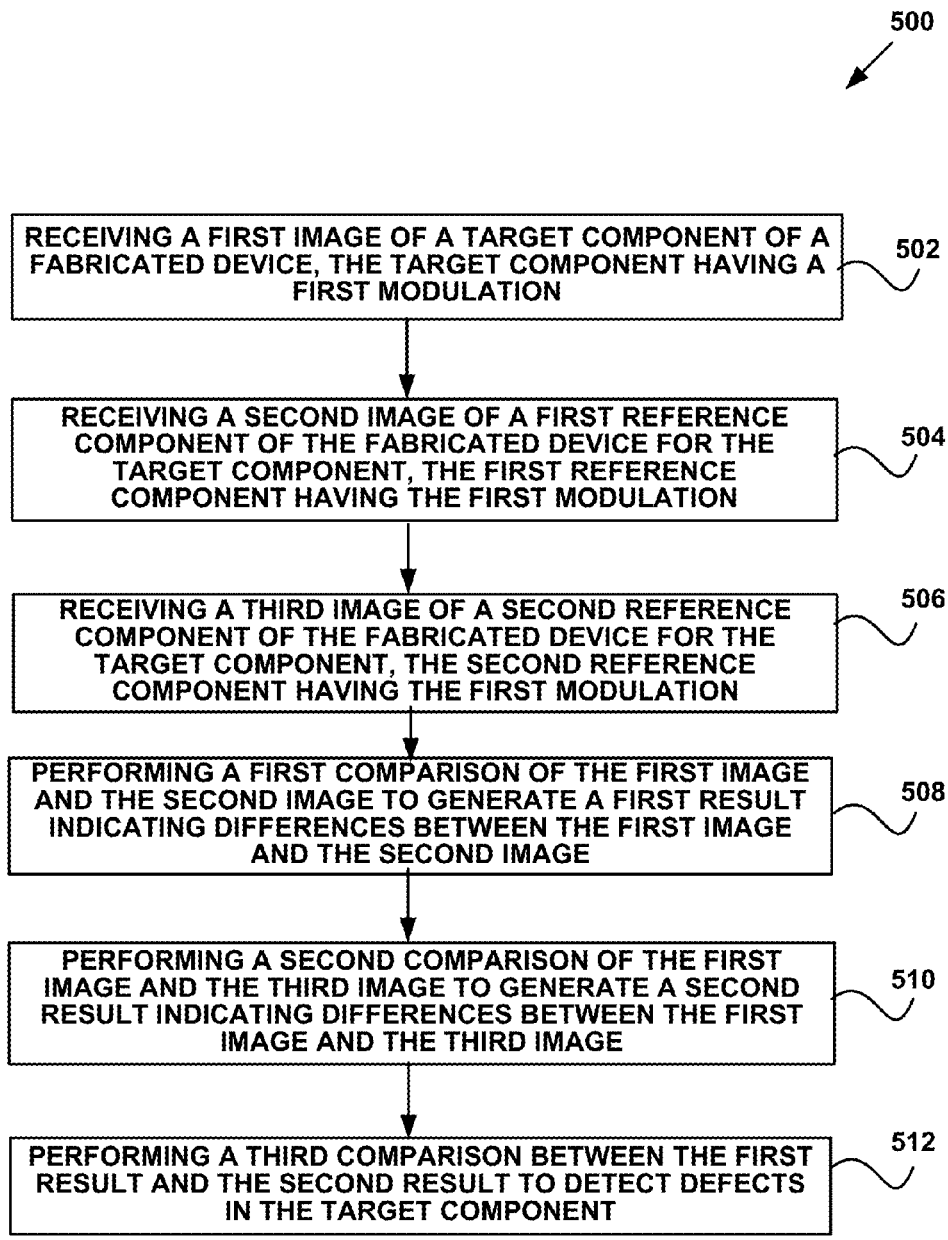
FIGURE 5

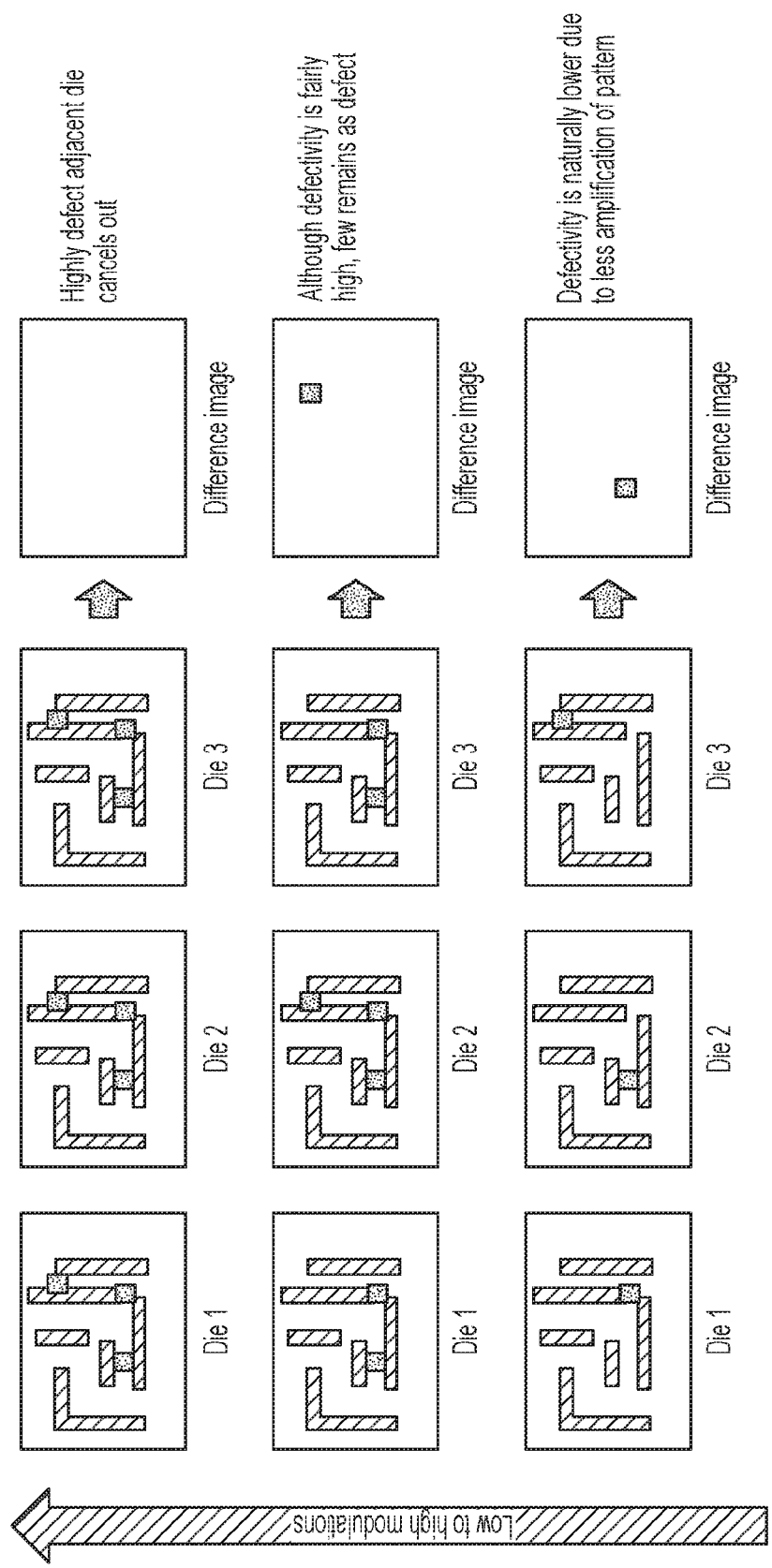
FIGURE 6

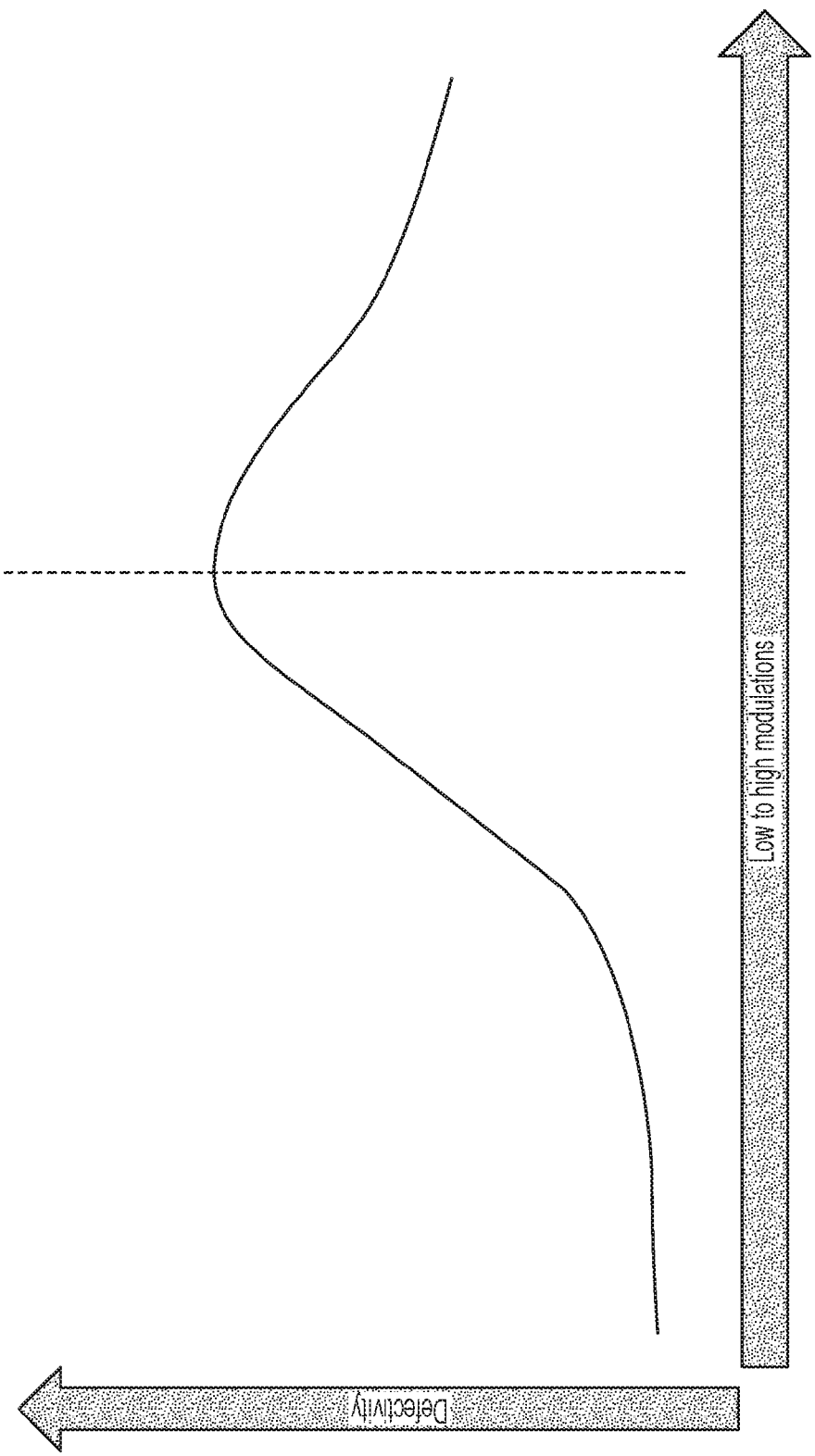
FIGURE 7

SYSTEM, METHOD AND COMPUTER PROGRAM PRODUCT FOR DETECTING DEFECTS IN A FABRICATED TARGET COMPONENT USING CONSISTENT MODULATION FOR THE TARGET AND REFERENCE COMPONENTS

RELATED APPLICATION(S)

This application claims the benefit of U.S. Provisional Patent Application No. 62/331,567 filed May 4, 2016, the entire contents of which are incorporated herein by reference.

FIELD OF THE INVENTION

The present invention relates to inspection of fabricated components, and more particularly to detecting defects in fabricated components.

BACKGROUND

Currently, defects in fabricated components (e.g. wafers) can be detected by comparing a target component of a fabricated device to reference components of the fabricated device. Inspection systems accomplish this by taking images of the target and reference components for comparison purposes. In particular, detecting the defects often involves performing two separate comparisons to generate two separate results, one comparison being between the target component and one of the reference components and another comparison being between the target component and the other one of the reference components. Any similarity between the two separate comparison results is generally used as an indicator of a defect in the target component.

Prior art FIG. 1 shows traditional layout for a wafer having a plurality of target components in a column 102, each being a same pattern modulated (i.e. amplified) by a different combination of parameter (e.g. focus (F) and exposure (E)) values, and further having a plurality of reference components in columns 104, 106 situated on either side of the column of target components and each being a nominal (i.e. not modulated) version of the same pattern. Thus, for any particular one of the target components in column 102, a reference component from column 104 and a reference component from column 106 may be used for detecting defects in the particular target component (see box 108). While the reference components are shown as being adjacent to the target component, this is not necessarily always the case. For example, in other wafer configurations the reference components for any particular target component may be those closest, but not necessarily adjacent, to the particular target component.

Unfortunately, traditional methods for performing the above described defect detection involve techniques that introduce inaccurate results. For example, as described above, the target components are modulated in an effort to amplify defects. This amplifies both defects and non-defects in the target component. However, the reference components are traditionally nominal. The modulation of only the target component then causes like structures in the target and reference components to appear different when there is in fact no defect. Thus, the number of defects traditionally identified can be overly high, which limits the ability to discern actual defects from falsely identified defects.

Prior art FIG. 2 shows an example of the effect of traditional defect detection methods where modulation of only the target component is employed. In FIG. 2, as the modulation is increased for the target component, the size of each part of the target component (including defects and non-defects) also increases, thus causing differentiation between the target and reference components on a part-by-part basis regardless of actual defect. As shown, at higher modulation the difference image resulting from the comparisons includes additional differences than at lower modulations. Existing patents disclosing the above described prior art techniques include U.S. Pat. Nos. 8,213,704 and 6,902,855, the descriptions of which are incorporated by the reference in their entirety.

There is thus a need for addressing these and/or other issues associated with the prior art techniques used for defect detection in fabricated components.

SUMMARY

In one embodiment, a fabricated device having consistent modulation between target and reference components is provided. The fabricated device includes a target component having a first modulation. The fabricated device further includes at least two reference components for the target component including a first reference component and a second reference component, where the first reference component and the second reference component each have the first modulation.

In another embodiment, a system, method, and computer program product are provided for detecting defects in a fabricated target component using consistent modulation for the target and reference components. In use, a first image of a target component of a fabricated device is received, the target component having a first modulation. Additionally, a second image of a first reference component of the fabricated device for the target component is received, the first reference component having the first modulation. Further, a third image of a second reference component of the fabricated device for the target component is received, the second reference component having the first modulation. Still yet, a first comparison of the first image and the second image is performed to generate a first result indicating differences between the first image and the second image, a second comparison of the first image and the third image is performed to generate a second result indicating differences between the first image and the third image, and a third comparison between the first result and the second result is performed to detect defects in the target component.

BRIEF DESCRIPTION OF THE DRAWINGS

FIG. 1 shows an example layout for a wafer, in accordance with the prior art.

FIG. 2 shows an example of the effect of traditional defect detection methods where modulation of only the target component is employed, in accordance with the prior art.

FIG. 3A shows a block diagram illustrating one embodiment of a non-transitory computer-readable medium that includes program instructions executable on a computer system for performing one or more of the computer-implemented methods described herein.

FIG. 3B is a schematic diagram illustrating a side view of one embodiment of an inspection system configured to detect defects on a fabricated device.

FIG. 4 illustrates a fabricated device having consistent modulation between target and reference components, in accordance with an embodiment.

FIG. 5 illustrates a method for comparing consistently modulated target and reference components to detect defects, in accordance with an embodiment.

FIG. 6 illustrates detected defects being progressively removed at increasing modulations, in accordance with an embodiment.

FIG. 7 illustrates statistics generated as a function of a number of defects detected in a pattern for different modulations, in accordance with an embodiment.

DETAILED DESCRIPTION

The following description discloses a fabricated device having consistent modulation between target and reference components, as well as a system, method, and computer program product that compare these consistently modulated target and reference components to detect defects. It should be noted that this system, method, and computer program product, including the various embodiments described below, may be implemented in the context of any inspection system (e.g. wafer inspection, reticle inspection, laser scanning inspection systems, etc.), such as the one described below with reference to FIG. 3B.

An additional embodiment relates to a non-transitory computer-readable medium storing program instructions executable on a computer system for performing a computer-implemented method for detecting defects using consistently modulated target and reference components. One such embodiment is shown in FIG. 3A. In particular, as shown in FIG. 3A, computer-readable medium 300 includes program instructions 302 executable on computer system 304. The computer-implemented method includes the steps of the method described below with reference to FIG. 5. The computer-implemented method for which the program instructions are executable may include any other operations described herein.

Program instructions 302 implementing methods such as those described herein may be stored on computer-readable medium 300. The computer-readable medium may be a storage medium such as a magnetic or optical disk, or a magnetic tape or any other suitable non-transitory computer-readable medium known in the art. As an option, computer-readable medium 300 may be located within computer system 304.

The program instructions may be implemented in any of various ways, including procedure-based techniques, component-based techniques, and/or object-oriented. techniques, among others. For example, the program instructions may be implemented using ActiveX controls, C++ objects, JavaBeans, Microsoft Foundation Classes ("MFC"), or other technologies or methodologies, as desired.

The computer system 304 may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system 304 may also include any suitable processor known in the art such as a parallel processor. In addition, the computer system 304 may include a computer platform with high speed processing and software, either as a standalone or a networked tool.

An additional embodiment relates to a system configured to detect defects on a fabricated device. One embodiment of such a system is shown in FIG. 3B. The system includes inspection system 305 configured to generate output for a component being fabricated on a wafer (or other device), which is configured in this embodiment as described further herein. The system also includes one or more computer systems configured for performing the operations described below with reference to FIG. 4. The one or more computer systems may be configured to perform these operations according to any of the embodiments described herein. The computer system(s) and the system may be configured to perform any other operations described herein and may be further configured as described herein.

In the embodiment shown in FIG. 3B, one of the computer systems is part of an electronic automation design (EDA) tool, and the inspection system and another of the computer systems are not part of the EDA tool. These computer system may include, for example, the computer system 304 described above with reference to FIG. 3A. For example, as shown in FIG. 3B, one of the computer systems may be computer system 308 included in EDA tool 306. The EDA tool 306 and the computer system 308 included in such a tool may include any commercially available EDA tool.

The inspection system 305 may be configured to generate the output for the component being fabricated on a wafer by scanning the wafer with light and detecting light from the wafer during the scanning. For example, as shown in FIG. 3B, the inspection system 305 includes light source 320, which may include any suitable light source known in the art. Light from the light source may be directed to beam splitter 318, Which may be configured to direct the light from the light source to wafer 322. The light source 320 may be coupled to any other suitable elements (not shown) such as one or more condensing lenses, collimating lenses, relay lenses, objective lenses, apertures, spectral filters, polarizing components and the like. As shown in FIG. 3B, the light may be directed to the wafer 322 at a normal angle of incidence. However, the light may be directed to the wafer 322 at any suitable angle of incidence including near normal and oblique incidence. In addition, the light or multiple light beams may be directed to the wafer 322 at more than one angle of incidence sequentially or simultaneously. The inspection system 305 may be configured to scan the light over the wafer 322 in any suitable manner.

Light from wafer 322 may be collected and detected by one or more channels of the inspection system 305 during scanning. For example, light reflected from wafer 322 at angles relatively close to normal (i.e., specularly reflected light when the incidence is normal) may pass through beam splitter 318 to lens 314. Lens 314 may include a refractive optical element as shown in FIG. 3B. In addition, lens 314 may include one or more refractive optical elements and/or one or more reflective optical elements. Light collected by lens 314 may be focused to detector 312. Detector 312 may include any suitable detector known in the art such as a charge coupled device (CCD) or another type of imaging detector. Detector 312 is configured to generate output that is responsive to the reflected light collected by lens 314. Therefore, lens 314 and detector 312 form one channel of the inspection system 305. This channel of the inspection system 305 may include any other suitable optical components (not shown) known in the art.

Since the inspection system shown in FIG. 3B is configured to detect light specularly reflected from the wafer 322, the inspection system 305 is configured as a BF inspection system. Such an inspection system 305 may, however, also be configured for other types of wafer inspection. For example, the inspection system shown in FIG. 3B may also include one or more other channels (not shown). The other channel(s) may include any of the optical components described herein such as a lens and a detector, configured as a scattered light channel. The lens and the detector may be further configured as described herein. In this manner, the inspection system 305 may also be configured for DF inspection.

The inspection system 305 may also include a computer system 310 that is configured to perform one or more steps of the methods described herein. For example, the optical elements described above may form optical subsystem 311 of inspection subsystem 305, which may also include computer system 310 that is coupled to the optical subsystem 311. In this manner, output generated by the detector(s) during scanning may be provided to computer system 310. For example, the computer system 310 may be coupled to detector 312 (e.g., by one or more transmission media shown by the dashed line in FIG. 3B, which may include any suitable transmission media known in the art) such that the computer system 310 may receive the output generated by the detector.

The computer system 310 of the inspection system 305 may be configured to perform any operations described herein. For example, computer system 310 may be configured for performing the defect detection as described herein. In addition, computer system 310 may be configured to perform any other steps described herein. Furthermore, although some of the operations described herein may be performed by different computer systems, all of the operations of the method may be performed by a single computer system such as that of the inspection system 305 or a stand alone computer system. In addition, the one or more of the computer system(s) may be configured as a virtual inspector such as that described in U.S. Pat. No. 8,126,255 issued on Feb. 28, 2012 to Bhaskar et al., which is incorporated by reference as if fully set forth herein.

The computer system 310 of the inspection system 305 may also be coupled to an other computer system that is not part of the inspection system such as computer system 308, which may be included in another tool such as the EDA tool 306 described above such that computer system 310 can receive output generated by computer system 308, which may include a design generated by that computer system 308. For example, the two computer systems may be effectively coupled by a shared computer-readable storage medium such as a fab database or may be coupled by a transmission medium such as that described above such that information may be transmitted between the two computer systems.

It is noted that FIG. 3B is provided herein to generally illustrate a configuration of an inspection system that may be included in the system embodiments described herein. Obviously, the inspection system configuration described herein may be altered to optimize the performance of the inspection system as is normally performed when designing a commercial inspection system. In addition, the systems described herein may be implemented using an existing inspection system (e.g., by adding functionality described herein to an existing inspection system) such as the 29xx/28xx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

FIG. 4 illustrates a fabricated device having consistent modulation between target and reference components, in accordance with an embodiment. As shown, the fabricated device includes a plurality of column sets 402A-D, each having a center column 404A-D of target components. The fabricated device also includes two columns 406A-D, 408A-D adjacent to either side of the center column 404A-D having reference components for the target components. The target components and reference components of the fabricated device have a like pattern. Additionally, the target component and reference components in each row of each of the column sets 402A-D have a consistent modulation (e.g. +4, +3, etc.) and form a modulation set. As also shown, each modulation set has a different modulation.

Defect detection for the pattern can therefore be performed separately for each modulation set, which eliminates differences otherwise occurring from comparing nominal reference components to a modulated target component. For example, where the fabricated device is a wafer, the target component and the reference components within the modulation set may be separate dies with like patterns situated on the wafer such that the defects may be detected on the target die. Exemplary embodiments of this defect detection are described in more detail with reference to the subsequent figures below.

It should be noted that while each column of target components 404A-D is shown as being situated with an adjacent column of reference components 406A-D, 408A-D on either side, the fabricated component may in other embodiments be configured to have a different layout, for example with the column of target components 404A-D not necessarily situated between the columns of reference components 406A-D, 408A-D and/or with the columns of reference components 406A-D, 408A-D not necessarily being adjacent to the column of target components 404A-D. Additionally, while FIG. 4 shows multiple modulation sets in each of multiple column sets 402A-D, it should be noted that the fabricated device is not necessarily limited to having multiple modulation sets. However, by configuring the fabricated device to have multiple column sets 402A-D, for example as shown, available space on the fabricated device may be leveraged to maximize data collection for defect detection (as described below) using the fabricated device.

In particular, in a simplified embodiment (not shown) the fabricated device can include a single modulation set, namely a target component having a first modulation, and at least two reference components for the target component including a first reference component and a second reference component, where the first reference component and the second reference component each have the first modulation. This modulation set may have any of the configurations mentioned above.

In the context of the present description, the modulation can be any amplification (positive or negative) of one or more parameters of the target and reference components. Thus, the modulation can be of an exposure, focus, etc. or any combination thereof. Just by way of example, within each modulation set, the modulation applied thereto may include a combination of a particular exposure value and a particular focus value. U.S. Pat. No. 8,213,704, which is incorporated herein by reference, discloses techniques for modulating a component of a fabricated device.

FIG. 5 illustrates a method 500 for comparing consistently modulated target and reference components to detect defects, in accordance with an embodiment. The consistently modulated target and reference components may be those situated on the fabricated component as described above with reference to FIG. 4. The descriptions and definitions provided above may equally apply to the present embodiment.

As shown in operation 502, a first image of a target component of a fabricated device is received, the target component having a first modulation. The first image may be received from a collector of an inspection system. Additionally, in operation 504, a second image of a first reference component of the fabricated device for the target component is received (e.g. from the collector), the first reference component having the first modulation. Further, in operation 506, a third image of a second reference component of the fabricated device for the target component is received (e.g. from the collector), the second reference component having the first modulation. In the present embodiment, the target component, first reference component, and second reference component may be situated within a modulation set on the fabricated device.

Still yet, in operation 508, a first comparison of the first image and the second image is performed to generate a first result indicating differences between the first image and the second image. The comparison may be performed by a processor of the inspection system and/or a separate computer system. In operation 510, a second comparison of the first image and the third image is performed (e.g. by the processor) to generate a second result indicating differences between the first image and the third image. Moreover, in operation 512, a third comparison between the first result and the second result is performed (e.g. by the processor) to detect defects in the target component.

In an embodiment, comparing the first result and the second result to detect defects in the target component may include determining from the comparison differences between the first result and the second result (e.g. in a difference image), and detecting each determined difference (e.g. each item in the difference image) as a defect in the target component. Thus, similarities between the first result and the second result may not necessarily be identified as defects in the target component. In other words, each determined difference may indicate that a location on the target component corresponding to a location of the determined difference on the difference image is a defect of the fabricated device.

By using consistently modulated target and reference components (e.g. in a modulation set) to detect defects, differences otherwise resulting from only modulating the target component (as disclosed with respect to the prior art) may be eliminated. This may enable more accurate detection of actual defects by eliminating those false-positive detections. In particular, defect location may be identified more accurately due to the concentrated difference image.

As an option, defects in the target component may be detected based on a predefined threshold being applied to the third comparison of the first result and the second result. The predefined threshold may be a difference threshold required to be met in order for corresponding locations on the first result and second result to be considered different, and ultimately in order for a defect to be detected at that location. In other words, if the first result and second result are sufficiently different at any particular location, as determined using the predefined threshold, then the corresponding location on the target component may be determined to be a defect.

When the consistently modulated target and reference components are employed in a modulation set, the predefined threshold may be reduced as a result of the lack of false-positive detections otherwise resulting from the prior art technique of only modulating the target component. For example, a larger threshold is typically required in the prior art in order to account for potential false-positive defect detections. Further, since the reference and target components in a modulation set are of a like pattern with a same modulation, they may therefore have a similar background noise level thus enabling the smaller threshold to be employed. The above described reduced threshold of the present embodiment may allow the inspection to be more sensitive and thus able to detect smaller defects.

FIG. 6 illustrates detected defects being progressively removed at increasing modulations, in accordance with an embodiment. In an embodiment, the method 500 described in FIG. 5 may be performed for each of a plurality of target components of the fabricated device having a like pattern and having different modulations for detecting defects in the pattern. For example, the method 500 may be repeated for each of the modulation sets shown in FIG. 4. As another option, additional modulation sets may be situated across more than one fabricated device, in a manner similar to that shown in FIG. 4 but for different modulations, such that the method 500 may be repeated for each of the modulation sets across the multiple fabricated devices.

As shown in FIG. 6, at a lower modulation of the pattern, fewer defects are detected. This is caused by differences between the target and reference components being less visible due to less amplification of the pattern within the target and reference components. As the modulation of the pattern increases, the number of defects that are detected may also increase. Again, this is caused by the differences between the target and reference components being more visible due to the greater amplification. However, defects detected at the lower modulation may also be removed when images for a higher modulation show that the locations previously identified as having differences are now able to be identified as being similar. In this way, some defects detected for a pattern may be progressively removed as the method 500 of FIG. 5 is repeated for each increasing modulation. As a result, defect counts can be automatically compensated by an inspection system. It should be noted, however, that some of the defects detected at the lower modulation may still be confirmed at the higher modulations when they are systematic and spatially random.

Furthermore, the predefined threshold described above with respect to FIG. 5, namely which is used as a threshold for identifying differences indicative of defects, may be the same for each instance of the method 500 performed for the various modulation sets. Use of the same predefined threshold may be enabled as a result of the consistent modulation across the components of each modulation set.

FIG. 7 illustrates statistics generated as a function of a number of defects detected in a pattern for different modulations, in accordance with an embodiment. As shown, to an extent, the number of defects detected in a pattern may increase as the modulation increases. As described above, however, defects detected at lower modulations may be removed at higher modulations, and so at some point the number of defects detected as the modulation increases may either plateau or even decrease. Thus, the statistics may show a curve at which the number of defects detected is maximized. The modulation associated with this point may be identified as optimal for detecting defects in the fabricated device. Identifying the optimal modulation for a particular pattern may enable future wafers to be fabricated accordingly with just enough modulations to cover dies dominated by random defects. Further, the increasing modulations may stabilize defectivity due to systematic defect by each critical pattern type.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a first image of a target component of a fabricated device, the target component having a first modulation;
receiving a second image of a first reference component of the fabricated device for the target component, the first reference component having the first modulation;
receiving a third image of a second reference component of the fabricated device for the target component, the second reference component having the first modulation;
performing a first comparison of the first image and the second image to generate a first result indicating differences between the first image and the second image;
performing a second comparison of the first image and the third image to generate a second result indicating differences between the first image and the third image;
performing a third comparison between the first result and the second result to detect defects in the target component.

2. The method of claim 1, wherein the first, second, and third images are received from a collector of an inspection system.

3. The method of claim 2, wherein the first comparison, second comparison, and third comparison are performed by a processor of the inspection system.

4. The method of claim 1, wherein comparing the first result and the second result to detect defects in the target component includes:
determining from the comparison differences between the first result and the second result, and
detecting each determined difference as a defect in the target component.

5. The method of claim 4, wherein similarities between the first result and the second result are not identified as defects in the target component.

6. The method of claim 1, wherein detecting defects in the target component is based on a predefined threshold being applied to the third comparison.

7. The method of claim 1, wherein the method is performed for each of a plurality of target components of the fabricated device having a like pattern and having different modulations for detecting defects in the pattern.

8. The method of claim 7, further comprising progressively removing defects detected for the like pattern as the method is repeated for each increasing modulation, when the detected defects are determined from a higher modulation to be associated with similarities between the first result and the second result.

9. The method of claim 7, wherein a same predefined threshold is applied to each third comparison repeated for the different modulations for detecting defects in the pattern.

10. The method of claim 7, wherein statistics are formed as a function of a number of defects detected in the pattern for each of the different modulations, and the statistics are utilized to identify an optimal modulation for detecting defects.

11. A computer program product embodied on a non-transitory computer readable medium, the computer program product including code adapted to be executed by a processor to perform a method comprising:
receiving a first image of a target component of a fabricated device, the target component having a first modulation;
receiving a second image of a first reference component of the fabricated device for the target component, the first reference component having the first modulation;
receiving a third image of a second reference component of the fabricated device for the target component, the second reference component having the first modulation;
performing a first comparison of the first image and the second image to generate a first result indicating differences between the first image and the second image;
performing a second comparison of the first image and the third image to generate a second result indicating differences between the first image and the third image;
performing a third comparison between the first result and the second result to detect defects in the target component.

12. An inspection system, comprising:
a collector for:
collecting a first image of a target component of a fabricated device, the target component having a first modulation,
collecting a second image of a first reference component of the fabricated device for the target component, the first reference component having the first modulation, and
collecting a third image of a second reference component of the fabricated device for the target component, the second reference component having the first modulation; and
a processor for:
performing a first comparison of the first image and the second image to generate a first result indicating differences between the first image and the second image,
performing a second comparison of the first image and the third image to generate a second result indicating differences between the first image and the third image, and
performing a third comparison between the first result and the second result to detect defects in the target component.

13. The inspection system of claim 12, wherein performing the third comparison between the first result and the second result to detect defects in the target component includes:
determining from the third comparison differences between the first result and the second result, and
detecting each determined difference as a defect in the target component.

14. The inspection system of claim 13, wherein similarities between the first result and the second result are not identified as defects in the target component.

15. The method of claim 12, wherein detecting defects in the target component is based on a predefined threshold being applied to the third comparison.

16. The method of claim 12, wherein performing the first comparison, second comparison, and third comparison is repeated for each of a plurality of target components of the fabricated device having a like pattern and having different modulations for detecting defects in the pattern.

17. The method of claim 16, the processor further for progressively removing defects detected for the like pattern as the first comparison, second comparison, and third comparison are repeated for each increasing modulation, when the detected defects are determined from a higher modulation to be associated with similarities between the first result and the second result.

18. The method of claim 16, wherein a same predefined threshold is applied to each third comparison repeated for the different modulations for detecting defects in the pattern.

19. The method of claim 16, wherein statistics are formed as a function of a number of defects detected in the pattern for each of the different modulations, and the statistics are utilized to identify an optimal modulation for detecting defects.

\* \* \* \* \*

UNITED STATES PATENT AND TRADEMARK OFFICE
CERTIFICATE OF CORRECTION

PATENT NO. : 9,940,705 B2
APPLICATION NO. : 15/194436
DATED : April 10, 2018
INVENTOR(S) : Allen Park et al.

Page 1 of 1

It is certified that error appears in the above-identified patent and that said Letters Patent is hereby corrected as shown below:

In the Claims

Column 10, Line 56 please replace "The method" with --The inspection system--.

Column 10, Line 59 please replace "The method" with --The inspection system--.

Column 10, Line 64 please replace "The method" with --The inspection system--.

Column 11, Line 4 please replace "The method" with --The inspection system--.

Column 11, Line 7 please replace "The method" with --The inspection system--.

Signed and Sealed this
Fourteenth Day of January, 2020

Andrei Iancu
*Director of the United States Patent and Trademark Office*